May 29, 1928.
C. H. DOELGER
1,671,629
ADJUSTABLE BEARING
Filed Dec. 18, 1925
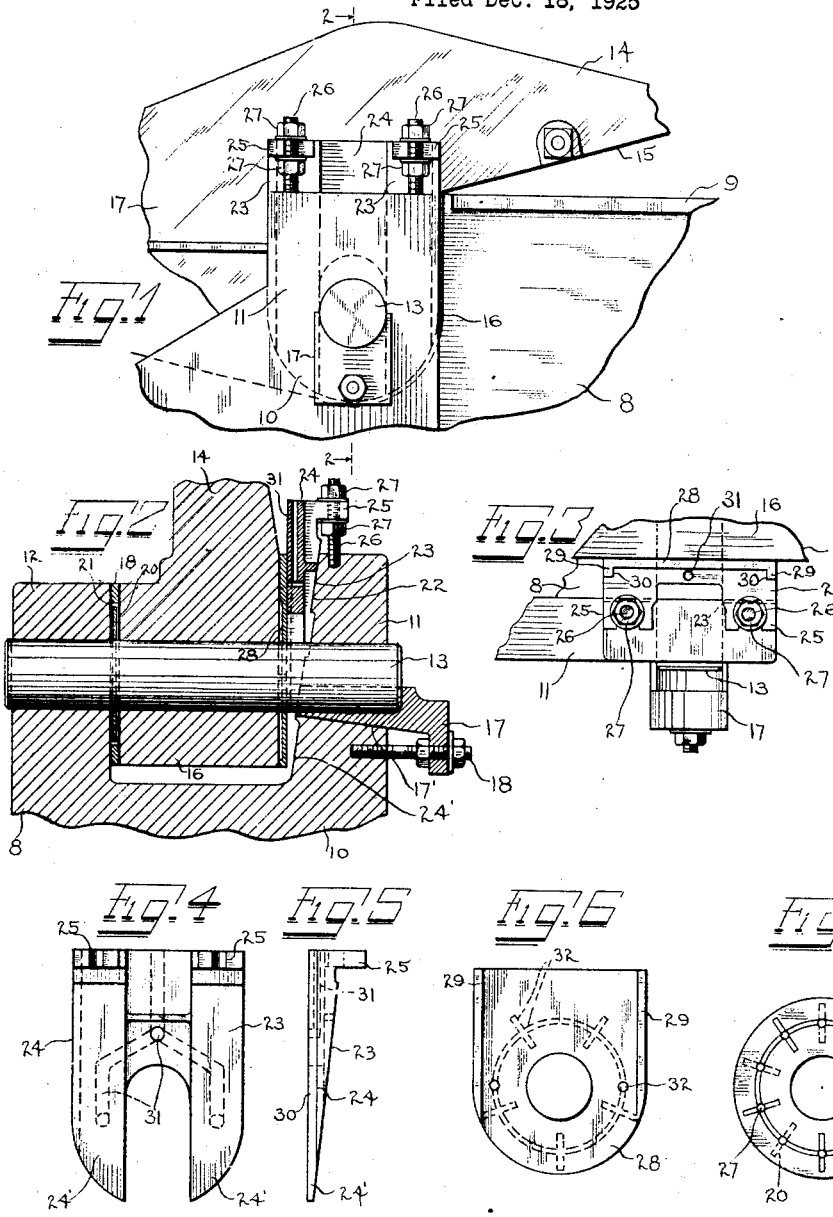
INVENTOR.
Charles H. Doelger,
BY Morsell, Kenney & Morsell
ATTORNEYS.

Patented May 29, 1928.

1,671,629

UNITED STATES PATENT OFFICE.

CHARLES H. DOELGER, OF MILWAUKEE, WISCONSIN, ASSIGNOR TO DOELGER AND KIRSTEN, OF MILWAUKEE, WISCONSIN, A COPARTNERSHIP CONSISTING OF CHARLES H. DOELGER AND OSCAR KIRSTEN, BOTH OF MILWAUKEE, WISCONSIN.

ADJUSTABLE BEARING.

Application filed December 18, 1925. Serial No. 76,253.

This invention relates to improvements in adjustable bearings more particularly, although not solely adapted for use with power shears.

In the use of power shears as ordinarily constructed it has been found that the bearing on the movable cutter member side of the shears wears out within a short time, due to the torsional strain, with the result that the cutting edge of the movable member under strain of cutting will tilt away from the fixed cutting member and will not make a clean cut and further will require more power in cutting.

It is one of the objects of the present invention to overcome the before mentioned objectionable features and provide an adjustable bearing which will take up the wear and will also maintain the cutting member in alined position with relation to the fixed cutting member.

A further object of the invention is to provide an adjustable bearing having means for easily lubricating the wearing surfaces of the shears.

A further object of the invention is to provide an adjustable bearing which is of simple construction, is strong and durable and is well adapted for the purpose described.

With the above and other objects in view the invention consists of the improved adjustable bearings and its parts and combinations as set forth in the claims, and all equivalents thereof.

In the accompanying drawing in which the same reference characters indicate the same parts in all of the views:

Fig. 1 is a side view of a portion of a power shears provided with the improved adjustable bearing;

Fig. 2 is a vertical sectional view thereof taken on line 2—2 of Fig. 1;

Fig. 3 is a fragmentary top view of the bearing;

Fig. 4 is a front view of one of the bearing parts;

Fig. 5 is an edge view of the part shown in Fig. 4;

Fig. 6 is a side view of another bearing part; and

Fig. 7 is a side view of the rear bearing.

Referring to the drawing the numeral 8 indicates a portion of the frame or support of a power shears of the type commonly known as alligator shears having a fixed lower cutting edge 9 and a U-shaped portion 10 forming bearings 11 and 12 through which the shaft 13 extends. The upper movable element on cutting member 14 is formed with a cutting edge 15, a medial hub portion 16 extending between the bearing portions 11 and 12 and a rearwardly extending portion 17 which is engaged by the power means (not shown) for operating the movable member. The cutting edge 15 coacts with the fixed cutting edge 9 and the shaft 13 extends through the medial hub portion 16 and is rigidly connected thereto so that the turning movement is between the shaft and the bearing portions of the support 8. A bearing member 17 having an angular lower face 17' is adjustably connected to the bearing member 11 by a stud screw 18 and said member 17 supports the end portion of the shaft extending through said member 11 and due to its lower angular face 17' is adjustable to take up wear.

A circular bearing member 18 surrounding the shaft 13 and interposed between the hub portion 14 and the bearing 12, is formed with an annular groove 19 on one side, radial cross grooves 20 on both sides and transverse connecting ports 21 for lubricating said bearing member 18. Due to the torsional strain between the shearing side of the hub 16 and the bearing 11 considerable wear is caused between said parts and to compensate for this wear the inner surface of the bearing 16 is angled as indicated by the numeral 22 to receive the angular outer face 23 of a wedge member 24. Said wedge member is of bifurcated formation so that its legs 24' will extend on opposite sides of the shaft 13 and the upper portion of the member is provided with outwardly extending slotted lugs 25 for receiving stud screws 26 which are mounted in the upper end portion of the bearing 11. Nuts 27 threaded on the studs and positioned above and below the lugs 25 provide for adjusting the position of the wedge member to compensate for wear. A bearing member 28 somewhat similar to the bearing member 18 surrounds the shaft 13 and is interposed between the wedge member 24 and the adjacent side portion of the hub 16. The bearing member 28 is provided with outwardly extending guide side flanges 29 which enter opposite edge elongated recesses or grooves 30 to form a guide for said wedge member and to prevent turning of the bearing member 28, the wedge member being also held in position by the stud screws 26.

The wedge member 24 is formed with oil holes and grooves 31 and the bearing member 28 is also provided with oil grooves and openings 32 to lubricate the bearing surfaces of the parts.

From the foregoing description, it will be seen that the parts can be easily adjusted to take up wear so that the shearing edge of the movable cutter member may be maintained in proper position with relation to the fixed cutting member to do efficient work.

What I claim as my invention is:

1. The combination with a shearing machine having a movable cutting member of an adjustable bearing therefor, comprising a support having spaced apart bearing portions, one of said bearing portions having an angularly extending inner face, a shaft journaled in said bearings, an adjustable member engaging the lower side of the shaft, the movable cutting member being mounted on said shaft between the bearings, a wedge-shaped member extending partly around the shaft and interposed between the movable cutting member and the angle faced bearing, with the angular face of the wedge-shaped member engaging the angular face of the bearing, said wedge-shaped member having an outwardly extending slotted lug, a stud screw connected to the bearing and extending through the slotted portion of the lug, and nuts threaded on the stud screw and positioned above and below the slotted lug for adjusting and maintaining the movable cutting member in adjusted position.

2. The combination with a shearing machine having a movable cutting member of an adjustable bearing therefor, comprising a support having spaced apart bearing portions, one of which has an inner angular face, a horizontal shaft journaled in the bearings, a horizontally adjustable bearing engaging the lower side of one end portion of the shaft, the movable cutting member being mounted on the shaft between the bearings, a vertically extending guide member extending partly around the shaft and interposed between the movable cutting member and one of the bearings, a vertically extending wedge-shaped member extending partly around the shaft and interposed between the guide member and the adjacent bearing, and means connected to the bearing and to the wedge member for adjusting and maintaining the movable cutting member in adjusted position.

3. The combination with a shearing machine having a movable cutting member of an adjustable bearing therefor, comprising a support having spaced apart bearing portions, a horizontal shaft journaled in the bearings, a horizontally adjustable bearing engaging the lower side of one end portion of the shaft, and one portion of the bearing, the movable cutting member being vertically extending and mounted on the shaft between the bearings, a vertically extending guide member extending partly around the shaft and interposed between the movable cutting member and one of the bearings, a vertically extending wedge-shaped member extending partly around the shaft and interposed between the guide member and the adjacent bearing, said wedge-shaped member having outwardly extending slotted lugs, stud screws connected to the bearings and extending through the slotted portions of the lugs, and nuts threaded on the stud screws and positioned above and below the slotted lugs for adjusting and maintaining the movable cutting member in adjusted position.

4. The combination with a shearing machine having a movable cutting member of an adjustable bearing therefor, comprising a support having spaced apart bearing portions, the outer one of said bearing portions having an angularly extending inner face and a bore having a lower angular faced portion, a horizontal shaft journaled in said bearings, the movable cutting member being mounted on the shaft between the bearings, a bearing member extending around the shaft and interposed between one of the bearings and the movable cutting member, a vertically extending guide member extending partly around the shaft and interposed between the movable cutting member and the other bearing with the angular face, said guide member having outwardly extending guide flanges, a vertically extending wedge-shaped member extending partly around the shaft and interposed between the movable cutting member and the angle-faced bearing, with the angular face of the wedge-shaped member engaging the angular face of the bearing and other portions of the cutting member engaging the guide flanges of the guide member, said wedge member having outwardly extending slotted lugs, stud screws mounted on the angularly faced bearing and extending upwardly therefrom through the slotted portions of the lugs, nuts threaded on the stud screws and positioned above and below the slotted lugs for adjusting and maintaining the movable cutting member in adjusted position, and a part bearing member having an angular faced portion which engages the angular face of the bearing bore, and another portion which engages and supports the outer end portion of the shaft and maintains said shaft in horizontal position and the guide and wedge members in engagement with each other.

5. The combination with an alligator shearing machine having an upper movable cutting jaw member and a lower fixed cutting jaw member of an adjustable bearing therefor comprising a support having spaced-apart bearing portions, a shaft journaled in said bearings, the movable cutting jaw member being mounted on said shaft between the bearings, a member extending partly around the shaft and interposed between the movable cutting member and one of the bearings, said member having an angular side face for forcing the movable cutting member horizontally toward the lower fixed cutting member, said member having an outwardly extending lug provided with an opening, a screw extending through the open portion of the lug, and a nut threaded on the screw adjacent the opening in the lug for adjusting and maintaining the upper movable cutting jaw member in close cutting position alongside of the fixed cutting jaw.

6. The combination with an alligator shearing machine having an upper movable cutting jaw member and a lower fixed cutting jaw member of an adjustable bearing therefor, comprising a support having spaced-apart bearing portions, one of said bearing portions having an angularly extending inner face, a shaft journaled in said bearings, the movable cutting jaw member being mounted on said shaft between the bearings, a wedge-shaped member extending partly around the shaft and interposed between the movable cutting jaw member and the angle-faced bearing, with the angular face of the wedge-shaped member engaging the angular face of the bearing, said wedge-shaped member having an outwardly extending lug provided with an opening, a screw extending through the open portion of the lug, and a nut threaded on the screw adjacent the opening in the lug for adjusting and maintaining the movable cutting jaw member in close cutting position alongside of the fixed cutting jaw.

In testimony whereof, I affix my signature.

CHARLES H. DOELGER.